(12) United States Patent
Bouvigne et al.

(10) Patent No.: US 12,020,719 B2
(45) Date of Patent: Jun. 25, 2024

(54) METHOD, A SYSTEM, AND A PROGRAM FOR PLAYING BACK AUDIO/VIDEO SIGNALS WITH AUTOMATIC ADJUSTMENT OF LATENCY

(71) Applicant: SAGEMCOM BROADBAND SAS, Rueil Malmaison (FR)

(72) Inventors: Gabriel Bouvigne, Rueil Malmaison (FR); Vincent Schott, Rueil Malmaison (FR); Frédéric Sodi, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 159 days.

(21) Appl. No.: 17/372,164

(22) Filed: Jul. 9, 2021

(65) Prior Publication Data

US 2022/0013131 A1    Jan. 13, 2022

(30) Foreign Application Priority Data

Jul. 10, 2020 (FR) ...................... 2007311

(51) Int. Cl.
*G10L 19/16* (2013.01)
*G10L 19/005* (2013.01)
*H04N 21/43* (2011.01)
*H04N 21/845* (2011.01)
*H04R 5/04* (2006.01)

(52) U.S. Cl.
CPC .......... *G10L 19/167* (2013.01); *G10L 19/005* (2013.01); *H04N 21/4305* (2013.01); *H04N 21/4307* (2013.01); *H04N 21/8456* (2013.01); *H04R 5/04* (2013.01)

(58) Field of Classification Search
CPC .......... H04N 21/4305; H04N 21/4307; H04N 21/8456; G10L 19/169; G10L 19/005; H04R 5/05
See application file for complete search history.

(56) References Cited

U.S. PATENT DOCUMENTS

2010/0142927 A1   6/2010   Lim
2013/0279888 A1   10/2013  Zeng
2017/0125026 A1   5/2017   Lawrence
2018/0077443 A1   3/2018   Lau

*Primary Examiner* — Yassin Alata
(74) *Attorney, Agent, or Firm* — MUNCY, GEISSLER, OLDS & LOWE, P.C.

(57) ABSTRACT

A method of playing back audio/video signals by means of an audio/video system includes a decoder appliance connected to a display screen and to a wireless speaker including a buffer storing audio frames so as to allow latency between receiving encoded audio frames and supplying decoded audio frames. The method comprises the steps of: determining a filling level of the buffer; comparing the filling level of the buffer with a filling target for the buffer and deducing a filling difference therefrom; and increasing or decreasing the number of audio frames that are stored as a function of the filling difference so as to adjust latency.

24 Claims, 5 Drawing Sheets

METHOD, A SYSTEM, AND A PROGRAM FOR PLAYING BACK AUDIO/VIDEO SIGNALS WITH AUTOMATIC ADJUSTMENT OF LATENCY

The present invention relates to the field of playing back audio/video signals.

BACKGROUND OF THE INVENTION

Audio/video decoders are known that comprise a demultiplexer having an input connected to a source of audio/video digital data, and two outputs connected respectively to an audio processor circuit and to a video processor circuit. The audio processor circuit is arranged to process the audio data and to transmit it in the form of audio signals to a sound playback member such as one or more loudspeakers connected to the decoder, and the video processor circuit is arranged to process the video data and to transmit it in the form of video signals to a display screen such as a TV set connected to the decoder.

It is essential for the transmission of the audio data to the sound playback member to be synchronized with the transmission of the video data to the TV set so that the sounds being played back correspond to the images being displayed.

For this purpose, and since the time required for the audio processing is not necessarily the same as the time required for the video processing, the audio and video processor circuits each include a respective buffer memory (commonly shortened to "buffer") in which the audio and video data is stored prior to being transmitted. The stored data is associated with presentation timestamps (PTS), and the decoder includes a reference clock used for determining the instant at which the audio data and the video data having the same presentation timestamp is to be transmitted simultaneously respectively to the sound playback member and to the TV set.

So long as the decoder is connected to the sound playback member by a wired connection that is unlikely to suffer external disturbances, this generally presents no problem.

Nevertheless, it is increasingly common for the decoder to be connected to a wireless speaker via a radio link of Wi-Fi type. The audio processor circuit of the decoder is then arranged to supply audio data to a radio transmitter, and the speaker includes a radio receiver connected to a decoder circuit arranged to supply the sound playback member with the audio data that results from decoding the audio data transmitted by the audio processor circuit. However, it commonly happens that the radio connection is disturbed, e.g. by the structure of the building or by interfering electromagnetic radiation. Such disturbances give rise to delays in receiving, decoding, and supplying the audio data to the sound playback member. Since these disturbances and the delays to which they give rise vary depending on location and also over time, manufacturers provide a buffer of predetermined size in the speaker in order to accommodate latency in the playback of audio data, which latency is capable of compensating some predetermined maximum delay (where the size of the buffer is directly proportional to the duration of that delay) so as to conserve synchronization with the video data even in the event of disturbance. As a result, in certain locations and/or at a given instant in a particular location, the buffer will be too large, while in other locations and/or at some other given instant in the same location, the buffer will be too small and will not enable perfect synchronization to be maintained between the image and the sound. Also, since the latency in sound playback also requires the video data to be delayed in order to conserve the synchronization between the image and sound, it is not desirable to provide a buffer that is so large that it introduces a delay that is perceptible by the user.

OBJECT OF THE INVENTION

A particular object of the invention is to remedy these drawbacks, at least in part.

SUMMARY OF THE INVENTION

To this end, the invention provides a method of playing back audio/video signals by means of an audio/video system comprising a decoder appliance connected to a display screen and to at least one wireless speaker, the decoder appliance comprising a demultiplexer having an input connected to a source of audio/video data, a first output connected to a video processor circuit arranged to supply video data to the display screen, and a second output connected to an audio processor circuit arranged to supply encoded audio frames to a radio transmitter, the speaker including a radio receiver connected to a decoder circuit arranged to supply a sound playback member with decoded audio frames resulting from decoding the encoded audio frames, the speaker including a clock that is synchronized with a clock of the decoder and a buffer for storing audio frames so as to allow latency between receiving encoded audio frames and supplying decoded audio frames, the method comprising the steps of:

determining the filling level of the buffer;
  comparing the filling level of the buffer with a target filling level for the buffer and deducing a filling difference therefrom; and
  increasing or decreasing the number of audio frames that are stored as a function of the filling difference so as to adjust the latency.

Thus, it is possible to adjust latency depending on requirements, and more particularly depending on the disturbances that have been encountered in the past, so as to conserve synchronization between the images and the soundtrack.

Advantageously, the number of stored audio frames is decreased if the filling difference is not less than a predetermined percentage about the filling target, and preferably the predetermined percentage is equal to about 25%, for example.

In a particular implementation, the filling target is equal to the sum of a safety value plus a margin.

Under such circumstances, alternatively:
  the margin is equal to the minimum filling level over a predetermined past duration, e.g. of about 2 minutes;
  the margin is equal to one-tenth of the sum of the preceding margin plus nine times the present filling level.

Preferably, separately or in combination:
  the safety value corresponds to a filling level allowing latency in the range 70 milliseconds (ms) to 200 ms;
  the safety level is increased if the margin has been negative during a predetermined time lapse for a number of times that is greater than a threshold;
  the method comprises a first stage of adjusting filling strongly when the filling level is less than a first threshold value corresponding to a first percentage of the safety value, the first threshold value being equal, for example, to about 80% of the safety value and the latency being modified by a value less than or equal to 20 ms;

the method includes a second stage of adjusting the filling strongly when the filling level is less than a second threshold value less than the first threshold value, the second threshold value being, for example, equal to about 60% of the safety value and the latency being modified by a value less than or equal to 40 ms.

According to a particular characteristic, the filling level of the buffer is determined each time an audio frame is extracted from the buffer or at regular intervals.

In a first particular mode of adjustment, the decoder and the speaker each include a respective clock with the clocks being synchronized, with the number of audio frames that are stored being increased by retarding the clocks by a predetermined duration and with the number of audio frames that are stored being decreased by advancing the clocks by a predetermined duration. This predetermined duration is preferably equal to a small value, e.g. less than or equal to 150 microseconds (µs), such as a value of 50 µs.

This duration may be predetermined in constant manner (the value of the adjustment remains constant during the utilization session) or in dynamic manner (the value of the adjustment varies as a function of the total amount of adjustment that is to be made).

In a second particular mode of adjustment, a presentation timestamp is associated with each image of video data and with each corresponding audio frame, with the number of stored audio frames being increased by adding a predetermined duration to the presentation timestamps, and with the number of stored audio frames being decreased by subtracting a predetermined duration from the presentation timestamps. This predetermined duration is preferably equal to a small value, e.g. less than or equal to 150 µs, such as by a value of 50 µs.

Advantageously, after decreasing latency, the method comprises a step of:
eliminating samples from an audio frame before transmission to the sound playback member or re-sampling an audio frame;
optionally, eliminating an image from the video data.

Advantageously, after increasing latency, the method includes a step of:
adding samples to an audio frame before transmission to the sound playback member or re-sampling an audio frame or interpolating samples in an audio frame;
optionally, inserting an image into the video data, e.g. by duplication or by interpolation.

The invention also provides:
a system for performing the method;
a program including instructions for performing the method;
a data medium containing such a program.

Other characteristics and advantages of the invention appear on reading the following description of a particular and nonlimiting embodiment of the invention.

BRIEF DESCRIPTION OF THE DRAWINGS

Reference is made to the accompanying drawings, in which.

DETAILED DESCRIPTION OF THE INVENTION

Figure 1:
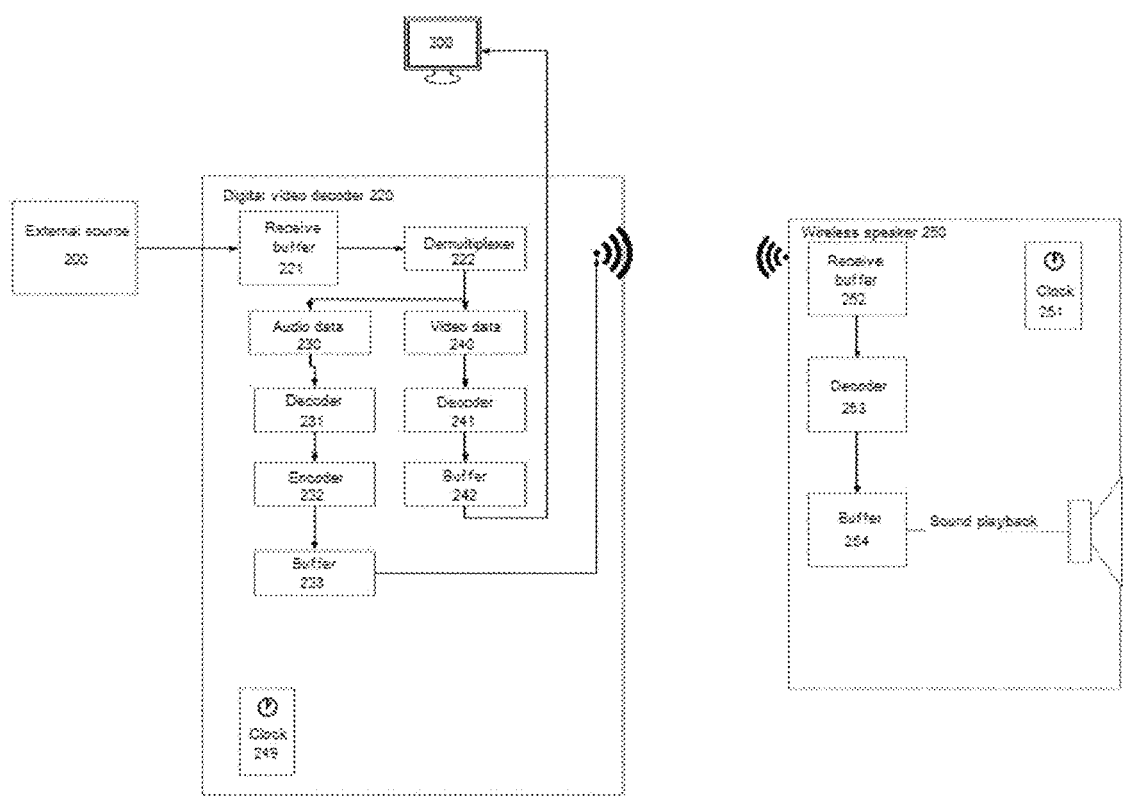
FIG. 1 is a diagrammatic view of a system of the invention.

With reference to FIG. 1, the audio/video system of the invention comprises a decoder appliance 220 connected to a display screen 300 and to a wireless speaker 250.

The decoder appliance 220 possesses an electronic control unit that comprises a demultiplexer 222 having an input connected to a source 200 of audio/video digital data via a receive buffer 221, a first output connected to a video processor circuit arranged to supply the display screen 300 with video data representative of images, and a second output connected to an audio processor circuit arranged to supply a radio transmitter with encoded audio frames.

The source 200 may be a digital data network (e.g. such as a satellite network, a cable TV network, an xDSL connection, the Internet, or a local computer network), or an internal source such as a hard disk or a removable memory medium such as a memory card.

The demultiplexer 222 is known per se and it is arranged to extract from the audio/video digital data both the audio data 230 and also the video data 240 for supplying respectively to the audio processor circuit and to the video processor circuit.

The video processor circuit comprises in succession a decoder 241 and a buffer 242 associated to the decoder 241 for storing the decoded video data. The video data are each representative of an image with which is associated a presentation time stamp (PTS). The buffer 242 is connected to the display screen 300, specifically a TV set.

The audio processor circuit comprises in succession a decoder 231, an encoder 232, and a buffer 233 for storing re-encoded audio data. Each piece of re-encoded audio data is an audio trame associated with a presentation time stamp (PTS) corresponding to the PTS of the corresponding image with which the audio frame is to be presented simultaneously. The encoder 232 is connected to the radio transmitter 234 via the buffer 233.

The speaker 250 comprises a radio receiver 255 connected to an electronic control unit that comprises a decoder circuit arranged to supply a sound playback member 256, specifically a loudspeaker, with decoded audio frames obtained by decoding the re-encoded audio data as received by the radio receiver 255.

The decoding circuit of the speaker 250 comprises both a decoder 253 having an input connected to the radio receiver 255 via a receive buffer 252 and an output connected to the audio playback member 256 via a further 254 for storing audio frames, and also an audio circuit (not shown) comprising in particular the digital to analog converter (DAC) and an amplifier. It can be understood that both the buffer 252 and the buffer 254 are capable of accommodating latency between receiving the re-encoded audio data and supplying the decoded audio data to the sound playback member 256.

In practice, the electronic control unit of the decoder appliance 220 and the electronic control unit of the speaker 250 comprise respective processors and memories enabling them to execute computer programs having instructions arranged to perform the program of the invention. Thus, the demultiplexers, the decoders, and the encoders in this example are portions of computer programs. In variants, dedicated electronic circuits could be used for performing these functions.

In operation, the electronic control unit of the decoder appliance 220 receives audio/video data from the source 200 and places it in its receive buffer 221. The audio data 230 is separated from the video data 240 by means of the demultiplexer 222.

The video data is decoded by the decoder 241 and is placed in the buffer 242.

The audio data is decoded by the decoder 231, re-encoded by the encoder 232 into a format appropriate for transmission to the speaker 250, and placed in the buffer 233, for sending subsequently to the speaker 250 by the radio transmitter 234.

The electronic control unit of the speaker 250 receives the re-encoded audio data via the radio receiver 255 and places it in its own receive buffer 252. This audio data is then decoded by the decoder 253 and placed in the buffer 254.

As mentioned above, each image of the video data is associated with a respective presentation time stamp (PTS). The audio data is processed in frames (each representing a succession of samples), and each audio frame is likewise associated with a PTS for enabling the audio frame to be made to correspond with the image with which it is to be played back simultaneously (by matching their PTSes).

It should be observed that the PTSes used in this example are not the PTSes coming from the incoming stream from the source 200, which might or might not contain PTSes (referred to as "primary" PTSes), but rather PTSes that are generated by the electronic control unit of the decoder appliance 220 (referred to as "secondary" PTSes). In order to be able to use the PTSes, the electronic control unit of the decoder appliance 220 and the electronic control unit of the speaker 250 include respective clocks 249 and 251. The clocks 249 and 251 are synchronized with each other, by means of network time protocol (NTP), precision time protocol (PTP), or other protocols. The clock 249 becomes the reference clock for playback, and thus acts as the program clock reference (PCR).

The secondary PTSes are calculated by the electronic control unit of the decoder appliance 220 by taking account of:

the presentation order and duration for of each image and audio frame of the input stream (which stream might potentially itself include primary PTSes expressed on the basis of an external PCR transmitted in the stream 200);

the presentation offset associated with the buffers used, firstly between the decoder appliance 220 and the speaker 250, and secondly within the speaker 250.

The PTSes are expressed as a number of "ticks" of the PCR reference clock, usually with a resolution that is smaller (in general the PCR is a 27 megahertz (MHz) clock, while the resolution of the PTSes is 90 kilohertz (kHz)).

When the time comes to present the video data (i.e. when the presentation timestamp is reached), the video frames are sent to the TV set 300 via a video link.

When the time comes to present the audio data (i.e. when the presentation timestamp is reached), the audio samples are sent to the DAC of the speaker 250 for subsequent amplification and playback by the loudspeaker of the sound playback member 256.

The buffers present in the decoder appliance 220 are managed in conventional manner.

At the speaker end, there are two possible strategies for insertion into the buffer memory:

decoding the audio frames as quickly as possible by means of the decoder 253, and placing each decoded frame in the buffer 254 prior to reaching the corresponding PTS; or keeping the encoded frames in the buffer 252, and causing the frames to be decoded by the decoder 253 immediately prior to the PTS, and then proceeding with sound playback.

These two possibilities do not have any consequence for the present invention, which may be implemented with either of them.

Figure 2:
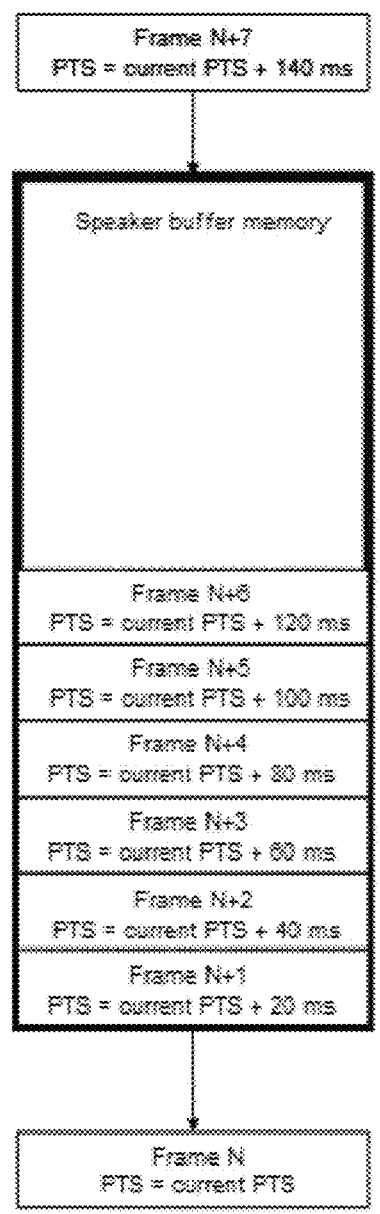
FIG. 2 is a diagrammatic view of a buffer of the speaker.

FIG. 2 shows the audio data stored in one of the buffers of the speaker 250 (which may be the buffer 252 or the buffer 254), and assuming that each frame lasts for 20 ms:

the frame N, of PTS that corresponds to the current PTS, is removed from the buffer in order to be played back by the playback member 256;

the frames N+1 to N+6 are in the buffer, waiting to be read (which will take place when their PTSes become equal to the current PTS);

the frame N+7, which is being received by the speaker 250, is about to enter the buffer.

At the moment corresponding to FIG. 2, there are 120 ms of samples present in the buffer. This corresponds to the present margin of the buffer. So long as disturbances in transmission last for less than 120 ms, there is no audible repercussion.

The buffer thus allows for latency of 120 ms between a frame being received and the frame being played back.

When the buffer is completely empty without any new frames being available, the "margin" is negative, with its value then corresponding to the time during which it has not been possible to play back any audio data.

The method of the invention seeks to enable the latency to be adjusted, and it comprises the steps of:

determining the filling level of the buffer;

comparing the filling level of the buffer with a target filling level for the buffer and deducing a filling difference therefrom;

increasing or decreasing the number of audio frames that are stored as a function of the filling difference so as to adjust the latency.

This method is described below in detail.

The target filling level, or "buffer target", is equal to the sum of a safety value plus a margin.

The "margin" of the buffer corresponds to the estimated level of robustness. The instantaneous margin corresponds to the value of the buffer at a given instant. Nevertheless, in order to minimize any risk of interruption, it is advantageous to calculate the margin as a moving value (and not an instantaneous value), which margin value is a function of present and past instantaneous values.

There are numerous methods for estimating such a moving value. For example:

the margin=the buffer minimum over the last two minutes;

the margin is estimated regularly (e.g. once every 20 ms): the margin=(prev_margin+present_buffer*9)/10, where prev_margin is the previously estimated margin and present_buffer is the present filling level of the buffer. This method amounts to implementing a low-pass filter serving to characterize the "forgetting" of past data/estimates.

Naturally, it is possible to use other methods, or to combine a plurality of methods with one another, e.g. such as combining the two methods given above by way of example.

Prior to adjusting latency, it is appropriate to determine whether it is desirable to increase or to decrease the current latency.

To do this, the first step in this example is to determine a safety threshold below which it is desired not to go. By way of example, a value lying in the range of 70 ms to 200 ms is appropriate in many circumstances. This "safety" value is for compensating unexpected disturbances.

In an environment that has previously encountered numerous disturbances (in which negative margin values have often occurred), it may be decided to increase this safety value.

The buffer filling target is determined as follows:

buffer_target=safety+desired_margin.

Figure 3:
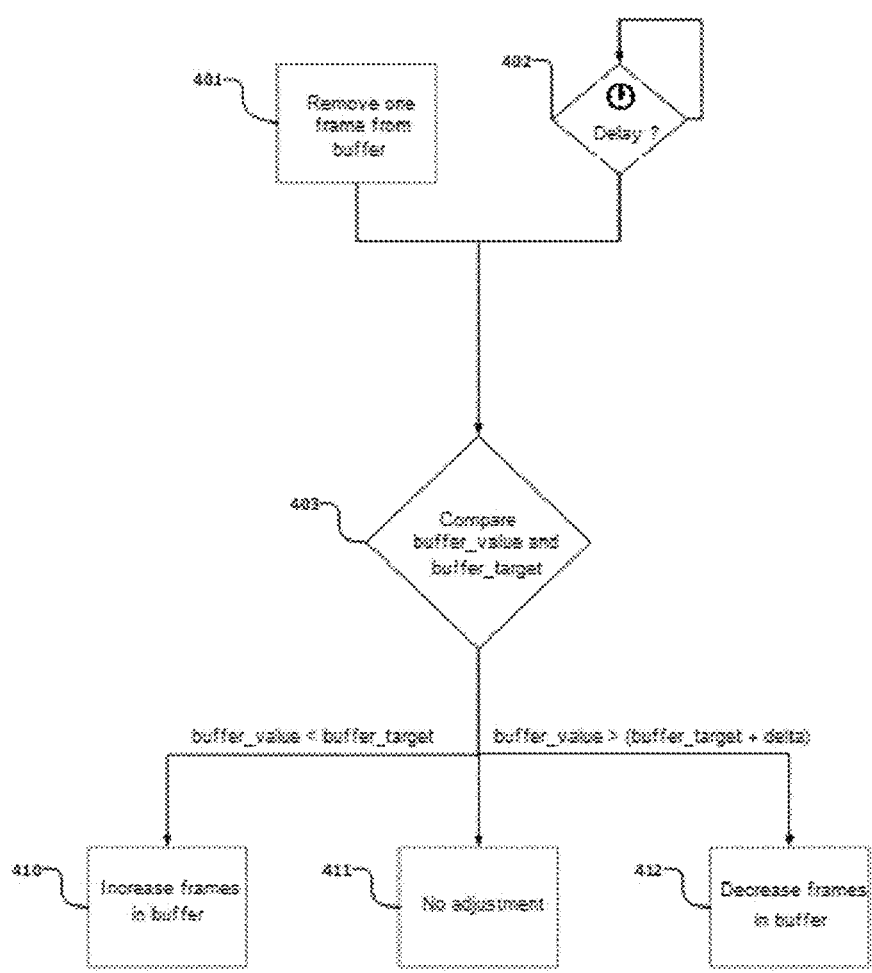
FIG. 3 shows a first mode of adjusting latency in accordance with the invention.

With reference to FIG. 3, the present filling level of the buffer (buffer_value) is calculated regularly, e.g. when removing the audio data of a frame for playback by the loudspeaker (401), or at regular intervals (e.g. once every 20 ms, which corresponds to the duration of one frame) if the buffer is empty (402).

The present filling level of the buffer is then compared (403) with the filling target of the buffer, using the following criteria:

if buffer_value<buffer_target, then it is necessary to increase the quantity of frames in the buffer (410);

if buffer_value>=(buffer_target+25%), then it is possible to decrease the quantity of frames in the buffer (412); or otherwise, no adjustment is made (411).

The percentage of 25% represents a damping value that can be adjusted as a function of the strategies used so as to avoid too many adjustments of latency. It is preferable to conserve a minimum value (not to reduce latency to 0%) in order to avoid unnecessary adjustments of the system.

It can be understood that increasing the quantity of frames in the buffer amounts to increasing latency, and that decreasing the quantity of frames in the buffer amounts to reducing latency.

In order to adjust latency, two approaches are possible:
adjusting the clocks; or
adjusting the PTSes.

There follows an explanation of adjusting the clocks.

In order to adjust latency so that it increases, the clocks 249 and 251 are retarded a little (e.g. by a duration less than or equal to 150 µs, such as 50 µs). Both clocks must be adjusted in identical manner in order to preserve audio/video synchronization.

In order to adjust latency so that it decreases, the clocks 249 and 251 are advanced.

In order to ensure both clocks are adjusted simultaneously, several approaches are possible:

the electronic control unit of the speaker 250 adjusts its own playback clock (251) and sends an adjustment message to the electronic control unit of the decoder appliance 220, which adjusts its clock 249;

the electronic control unit of the speaker 250 transmits adjustment information to the electronic control unit of the decoder appliance 220 (or else the appliance itself calculates the necessary adjustments, if it has access to the buffer values of the speaker), and the electronic control unit of the decoder appliance 220 adjusts its clock. Thereafter, the electronic control unit of the decoder appliance 220 sends a clock adjustment message to the electronic control unit of the speaker 250, or else both clocks become synchronized without requiring an adjustment message if a protocol such as NTP or PTP is used. It should be observed that it is preferable for it to be the electronic control unit of the decoder appliance 220 that performs clock adjustment, since that makes it possible to manage situations in which a plurality of speakers 250 are connected to (and are thus servocontrolled on) the electronic control unit of the decoder appliance 220.

Figure 4:
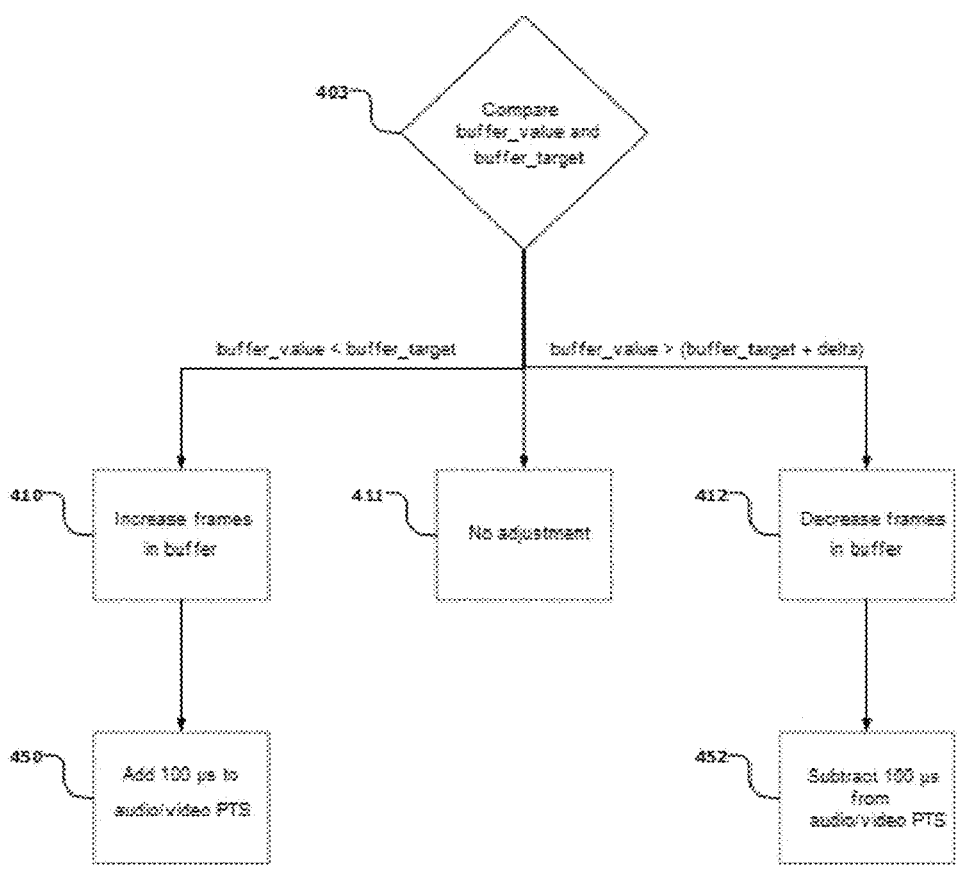
FIG. 4 shows a second mode of adjusting latency in accordance with the invention.

The adjustment of the PTSes is explained below with reference to FIG. 4. The idea is no longer to adjust the clock, but rather to adjust the PTSes of future audio and video data.

For example, instead of retarding the clock by 100 µs, it is possible to add 100 µs to the future PTSes of the audio and video data (450), which has the effect of increasing latency, and thus of increasing the filling level of the buffer. In contrast, reducing the PTSes (452) has the consequence of reducing latency, and thus of reducing the filling level of the buffer.

The PTSes can be adjusted either simultaneously by the electronic unit of the speaker 250 and by the electronic unit of the decoder appliance 220, or else totally by the electronic unit of the decoder appliance of 220. This second approach is simpler, since all of the adjustment is performed by a single piece of equipment. To do this, the electronic unit of the speaker 250 transmits information about the filling level of its buffer regularly to the electronic unit of the decoder appliance 220, thus enabling the electronic unit of the decoder appliance of 220 to have all of the information necessary for enabling it to evaluate the adjustments that need to be made.

Regardless of whether it is the clocks that are adjusted or the PTSes, the effects on playback of the audio and video data are similar.

In the speaker 250, adjusting the playback clock gives rise to adjustments in the audio data to be played back, with various technical possibilities, e.g. such as:

in order to decrease latency:
removing PCM samples; and
re-sampling a frame;

in order to increase latency:
adding PCM samples (copies of preceding samples);
interpolating PCM samples;
re-sampling a frame.

In the decoder appliance of 220, adjusting the clock or the PTSes has an impact on the moments at which images are presented, and in extreme cases (adjustment by more than the duration of an image) an image might be duplicated or eliminated.

It is preferable to make the adjustments progressively (e.g. by a unit duration that is less than or equal to 150 µs, such as 50 µs each time), so that the audio/video adjustments (which are likewise progressive) are perceptible to the user as little as possible.

For example, with 20 ms audio frames, there are 50 audio frames per second. With a maximum adjustment of 50 µs for each audio frame, the system of the invention can adjust latency by a maximum duration of 50*50 µs, i.e. 2.5 ms per second. This is not perceptible by the user.

The above-defined progressive adjustment enables the system to be adjusted smoothly, which is particularly effective when disturbances are more or less regular.

Figure 5:
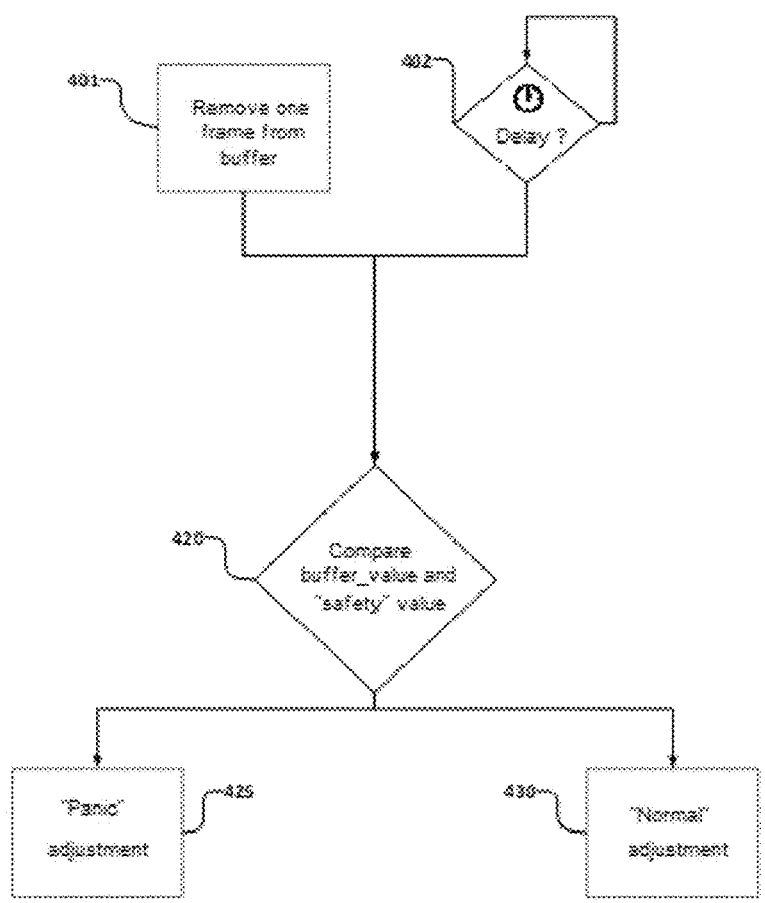
FIG. 5 shows a third mode of adjusting latency in accordance with the invention.

Nevertheless, for a situation in which disturbances occur massively or suddenly, it can happen that the above-described normal mode of adjustment is insufficient. Under such circumstances, the method of the invention advantageously provides an exceptional mode of adjustment, referred to as "panic" mode, as shown in FIG. 5.

In order to implement this exceptional mode of adjustment, a "strong" adjustment threshold is determined beforehand for when the present filling level of the buffer (buffer_value) is much less than the safety value. For example, a threshold of 80% of the safety value may be selected, such that the "panic" mode is triggered when:

buffer_value<80%*safety.

In "panic" mode, latency adjustment is allowed to increase more strongly, e.g. by 10 ms or even 20 ms.

In a variant, it is also possible to adjust latency more strongly as the present filling level of the buffer drops further below the safety value. For example, a plurality of thresholds may be defined, namely a first threshold at 80% of the safety value, a second threshold at 60% of the safety value, and a third threshold at 40% of the safety value. Each threshold is associated with a respective adjustment level, such that:
- if (60%*safety)<buffer_value≤(80%*safety), then adjust latency by 10 ms;
- if (40%*safety)<buffer_value≤(60%*safety), then adjust latency by 20 ms;
- if buffer_value≤(40%*safety), adjust latency by 40 ms.

The strongest adjustments are more likely to be perceived by the user, but that is a lesser evil compared with a break in audio playback.

The latency adjustment values given above are given solely by way of example. Thus, the specified values of 10 ms, 20 ms, and 40 ms could be replaced by other values, e.g. such as 20 ms, 40 ms, and 100 ms, the essential point being that the first value is less than or equal to the second, which is itself less than or equal to the third.

On the same principle, the safety values (80%, 60%, and 40%) could be replaced by other values.

If the buffer becomes completely empty during reading after the preceding audio frame has been played back in full, then there will be a break in the sound. Under such circumstances, instead of adjusting progressively, it is advisable to accept that there has been a break, and to fill the buffer up to the target value before starting to read again. Specifically, if this is the situation, that means that progressive adjustments have not been sufficient for keeping audio data in the buffer, and it is probable that any attempt at adjusting progressively will end up with the buffer becoming completely empty repeatedly, giving rise to multiple breaks in playback. Under such circumstances, it can be preferable to have a single break of greater length prior to starting to read again with the buffer at an optimum filling level, rather than having a system oscillating between breaks and playback.

Naturally, other variants of this "panic" mode are possible. For example, in a simplified mode, once buffer_value<safety, the filling level of the buffer could be adjusted directly up to the target value buffer_target before starting to read again. "Panic" mode is considered as having priority over "normal" dynamic adjustment of latency:
- the present filling level of the buffer (buffer_value) is calculated regularly, e.g. when removing the audio data of a frame for playback on the loudspeaker (401), or at regular intervals (e.g. every 20 ms, which corresponds to the duration of one frame) if the buffer is empty (402);
- the filling level of the buffer is initially evaluated relative to the safety value (420);
- as a function of this evaluation, adjustment is triggered either in "panic" mode (425), or else in "normal" mode (430).

When starting playback (reading a recording on a hard disk or a video on demand, channel hopping, . . . ), it is appropriate to determine a desired initial latency, since, on starting reading, the system does not have an estimate of the present filling level (buffer_value).

Several approaches are possible, such as for example:
- using a starting latency that is determined as a function of the latencies encountered during earlier playback;
- using a large starting latency, and allowing the system to optimize on its own;
- using a small latency, and allowing the system optionally to adjust its latency, should that be necessary.

The third approach presents the advantage of starting playback with latency that is small, which is particularly advantageous when channel hopping repeatedly, so that the channels are played back as quickly as possible.

By way of example, it might be decided to start playback when the filling target (buffer_target value) is reached, or even before (e.g. 50 ms). Under such circumstances, after starting playback quickly, the system makes systematic adjustments to latency once a playback session is under way.

In a particular implementation, the decoder appliance is connected to a plurality of wireless speakers (specifically a number N of speakers).

Under such circumstances, the determined filling level is calculated from the filling levels of the buffers of at least a group of speakers from among said speakers. Thus, instead of taking account of the present filling level (buffer_value) of a single speaker, the system takes account of a global buffer value (global_buffer_value) that is calculated from the present filling level (buffer_value) of each of the speakers in the group under consideration.

In a first a variant, the determined filling level is calculated from the filling levels of the buffers of the N speakers.

Specifically, the global value is calculated as being the lowest filling level from among the present filling levels of the buffers of the N speakers that are paying back sound, i.e.:

global_buffer_value=min(buffer_value$_1$, . . . , buffer_value$_N$).

Thereafter, the system uses this global buffer value (instead of and replacing the individual value as defined in the above-described implementation) in order to calculate the necessary latency adjustment. Thus, the system adjusts itself in such a manner as to avoid any of the speakers presenting a break in audio.

In a second variant, the global value of the buffer is calculated while taking only a subset of the speakers into consideration, choosing to leave the potential for one or more speakers to suffer breaks in sound playback. By way of example, such a variant is advantageous in a system possessing synchronized speakers in a plurality of rooms (referred to as a "multi-room" audio system). Under such circumstances, the global buffer value could be calculated while taking into consideration only the speakers that are situated in the same room as the room in which the TV set is located.

The underlying logic is that it is difficult to accept breaks in sound from the speakers actively involved in the TV experience, while such breaks are more acceptable for speakers situated in other rooms. When the connections with the speakers in the other rooms are more disturbed, this makes it possible to avoid excessively increasing the latency of the main TV system.

In this second variant, two groups are defined: a group of main speakers that are situated in the proximity of the TV set, and that are needed for audio-video playback of the "home cinema" type, and a group of auxiliary speakers that are situated in one or more other rooms.

With the simplest strategy, the global filling level is calculated while making use of the buffer filling levels of the main speakers only.

The global value then corresponds to the lowest of the filling levels from among the present filling levels of the buffers of the main speakers.

Intermediate strategies are possible, giving precedence to the speakers that are said to be "necessary" (those that are situated in the same room as the screen), while still taking account of the "auxiliary" speakers, providing they do not penalize the system excessively.

For example, account may be taken of the auxiliary speakers only if their buffer values are close to the buffer values of the necessary speakers, with a tolerance threshold of 5% or 10%. Under such circumstances, the global buffer value is calculated as follows (with a selected tolerance threshold of 10%):

necessary_buffer value=min(necessary buffer_values)

global buffer_value=min(necessary_buffer_value, max(necessary_buffer_value*0.9,min(auxiliary buffer values))).

Naturally, the invention is not limited to the embodiment described and covers any variant coming within the ambit of the invention as defined by the claims.

In particular, the structure of the system could be different from that described, and by way of example it could have some other number of wireless speakers.

The Wi-Fi transmitter could be incorporated in the decoder, or the decoder could be connected to a network of the local area network (LAN) type by a wired connection. The speaker could be connected to the LAN type network via a Wi-Fi connection using an access point external to the decoder.

The method may be applied to any one of the buffers of the speaker (e.g. 252 or 254) or to a plurality of the buffers of the speaker.

More than two adjustment thresholds may be provided, or on the contrary there could be only one.

The invention claimed is:

1. A method of playing back audio/video signals by an audio/video system comprising a decoder appliance connected to a display screen and to at least one wireless speaker, the decoder appliance comprising a demultiplexer having an input connected to a source of audio/video data, a first output connected to a video processor circuit arranged to supply video data to the display screen, and a second output connected to an audio processor circuit arranged to supply encoded audio frames to a radio transmitter, the speaker including a radio receiver connected to a decoder circuit arranged to supply a sound playback member with decoded audio frames resulting from decoding the encoded audio frames, the speaker including a clock that is synchronized with a clock of the decoder and a buffer for storing audio frames so as to allow latency between receiving encoded audio frames and supplying decoded audio frames, the method comprising the steps of:
   determining a filling level of the buffer of said at least one speaker;
   comparing the filling level of the buffer of said at least one speaker with a filling target equal to the sum of a safety value, aimed to compensate unexpected disturbances and corresponding to a minimum value of the filling target, plus a margin equal to a sliding value as a function of present and past filling levels of the buffer, and deducing a filling difference therefrom;
   increasing or decreasing the number of audio frames that are stored as a function of the filling difference so as to adjust the latency.

2. The method according to claim 1, wherein the number of stored audio frames is increased by retarding the clocks by a predetermined duration and the number of stored audio frames is decreased by advancing the clocks by a predetermined duration.

3. The method according to claim 2, wherein the predetermined duration is less that are equal to about 150 µs.

4. The method according to claim 1, wherein a presentation timestamp is associated with each image of video data and with each corresponding audio frame, with the number of stored audio frames being increased by adding a predetermined duration to the presentation timestamps, and with the number of stored audio frames being decreased by subtracting a predetermined duration from the presentation timestamps.

5. The method according to claim 4, wherein the predetermined duration is less than or equal to about 150 µs.

6. The method according to claim 2, including a step, after decreasing latency, of:
   eliminating samples from an audio frame before transmission to the sound playback member or re-sampling an audio frame;
   optionally, eliminating an image from the video data.

7. The method according to claim 2, including a step, after increasing latency, of:
   adding samples to an audio frame before transmission to the sound playback member or re-sampling an audio frame or interpolating samples in an audio frame;
   optionally, inserting an image into the video data, e.g. by duplication or by interpolation.

8. The method according to claim 1, wherein the number of stored audio frames is decreased if the filling difference is greater than or equal to a predetermined percentage above the filling target.

9. The method according to claim 1, wherein the margin is equal to the minimum filling level over a predetermined past duration.

10. The method according to claim 1, wherein the margin is equal to one-tenth of the sum of the preceding margin plus nine times the present filling level.

11. The method according to claim 1, wherein the safety value corresponds to a filling level allowing latency in the range 70 ms to 200 ms.

12. The method according to claim 10, wherein the safety level is increased if the margin has been negative during a predetermined time lapse for a number of times that is greater than a threshold.

13. The method according to claim 1, comprising a first stage of adjusting filling strongly when the filling level is less than a first threshold value corresponding to a first percentage of the safety value.

14. The method according to claim 13, wherein the first threshold value is equal to about 80% of the safety value, and the latency is modified by a value less than or equal to 20 ms.

15. The method according to claim 13, including a second stage of adjusting the filling strongly when the filling level is less than a second threshold value less than the first threshold value.

16. The method according to claim 13, wherein the second threshold value is equal to about 60% of the safety value, and the latency is modified by a value less than or equal to 40 ms.

17. The method according to claim 1, wherein the filling level of the buffer is determined each time an audio frame is extracted from the buffer or at regular intervals.

18. The method according to claim 1, wherein the decoder appliance is connected to a plurality of wireless speakers and wherein the predetermined filling level is a global filling level of the buffers of at least a group of speakers from among said speakers.

19. The method according to claim 18, wherein the speakers that belong to the group are in the proximity of the screen.

20. The method according to claim 18, wherein the global filling level is the minimum value of the filling levels of the buffers of each of the speakers under consideration.

21. A decoder appliance arranged to perform the method according to claim 1.

22. A speaker arranged to perform the method according to claim 1.

23. A non-transitory computer-readable data medium containing a program including instructions arranged to perform the method according to claim 1.

24. A multimedia playback system comprising a decoder connected to a display screen and to at least one wireless speaker, the decoder comprising a demultiplexer having an input connected to a source of audio/video digital data, a first output connected to a video processor circuit arranged to supply video data to the display screen, and a second output connected to an audio processor circuit arranged to supply encoded audio frames to a radio transmitter, the speaker including a radio receiver connected to a decoder circuit arranged to supply a sound playback member with decoded audio frames resulting from decoding the encoded audio frames, the speaker including a buffer for storing audio frames so as to allow latency between receiving encoded audio frames and supplying decoded audio frames, and the system including at least one electronic control unit arranged to perform the method according to claim 1.

* * * * *